United States Patent
Sachdev et al.

(10) Patent No.: US 6,426,007 B1
(45) Date of Patent: Jul. 30, 2002

(54) REMOVAL OF SOLUBLE METALS IN WASTE WATER FROM AQUEOUS CLEANING AND ETCHING PROCESSES

(75) Inventors: Krishna G. Sachdev; Umar M. Ahmad, both of Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,566

(22) Filed: Apr. 29, 1999

(51) Int. Cl.[7] ............................... C02F 1/42; C02F 9/00
(52) U.S. Cl. ....................... 210/663; 210/684; 210/685; 210/688; 210/692; 210/912
(58) Field of Search ............................ 210/669, 683, 210/684, 685, 692, 663, 688, 912

(56) References Cited

U.S. PATENT DOCUMENTS

| | | | |
|---|---|---|---|
| 4,032,457 A | 6/1977 | Matchett | 210/489 |
| 4,189,381 A | 2/1980 | Laferty et al. | 210/688 |
| 4,891,193 A | 1/1990 | Beutier et al. | 423/54 |
| 5,082,568 A | 1/1992 | Holler | 210/679 |
| 5,500,127 A * | 3/1996 | Carey et al. | 210/685 |
| 5,545,309 A * | 8/1996 | Shimizu et al. | 210/691 |

* cited by examiner

*Primary Examiner*—Ivars Cintins
(74) *Attorney, Agent, or Firm*—DeLio & Peterson LLC; John J. Tomaszewski; Margaret A. Pepper

(57) ABSTRACT

This invention provides a method for treating waste water containing organic bases such as tetramethyl ammonium hydroxide and dissolved metals such as Mo, W, Cu and Ni which are generated from mask cleaning and Mo etching processes. The organic base along with Cu and Ni is first removed preferably by passing the effluent through a cation exchange resin followed by passing the cation exchanged effluent through an anion exchange resin to remove the Mo and W metals. The treated waste water meets federal guidelines for dissolved metal contaminant limits for water discharge to water ways. Alternatively, filtered effluent is directly passed through an anion exchange resin to remove Mo and W and the dissolved TMAH and copper and nickel are removed by cation exchange.

10 Claims, No Drawings

REMOVAL OF SOLUBLE METALS IN WASTE WATER FROM AQUEOUS CLEANING AND ETCHING PROCESSES

BACKGROUND OF THE INVENTION

1. Field of the Invention

This invention relates generally to waste water treatment to remove soluble metals for safe water discharge. This invention is particularly concerned with removal of dissolved molybdenum (Mo) and tungsten (W) metals from effluent generated in the cleaning of screening masks and semiconductor substrate devices with aqueous tetramethyl ammonium hydroxide (TMAH) to remove conductive metallic paste residue. This invention is also particularly concerned with removal of soluble Mo in aqueous TMAH washings from an oxide removal process in a Mo etching method based on acidic pH etchants.

2. Description of Related Art

In the fabrication of multilayer ceramic substrates for packaging semiconductor devices, conductive metal patterns are screened onto individual punched ceramic green sheets using a mask, such as a metal mask. After screening, the green sheets are assembled, aligned, laminated and sintered to obtain a multilayer ceramic substrate. Conductive pastes used in screening processes for delineation of wiring and via metallurgy patterns comprise metal particles dispersed in an organic binder and solvent carrier along with other additives, typically, wetting agents, dispersants/surfactants, plasticizers, etc.

Most commonly used conductive pastes in multilayer ceramic fabrication are based on molybdenum metal powder dispersed in an organic polymer binder such as ethyl cellulose, polymethyl methacrylate, polyhydrocarbon resins and the like, in a high boiling organic solvent vehicle. Conductive pastes other than molybdenum-based or polymer-metal composites contain copper, tungsten and nickel or binary metals as bismuth coated copper and tin plated copper as the metal filler.

Conductive paste screening on ceramic green sheets through metal masks, for example, typically causes retention of some residue on the mask surface and around the mask features. Therefore, in order to prevent any product defects in the subsequently screened pattern due to such residue, the masks are cleaned after one or more screening passes. The pastes referred to above are readily removed from metal surfaces with organic solvents and until recently, solvent-based cleaning has been employed for mask cleaning and other processes requiring removal of organic-metal/inorganic particulate from substrates. The organic solvents (particularly chlorinated solvents) which are effective in cleaning such residues, however, have the problem of environmental regulatory issues and human health concerns in large scale processing, which has resulted in an increasing focus of industry on aqueous cleaning so as to minimize, and preferably to eliminate the use of chlorinated solvent-based cleaning.

An aqueous cleaning method for polymer-metal composite paste, e.g., Mo-based screening paste from metal mask and semiconductor cleaning, employs a dilute solution of tetramethyl ammonium hydroxide (TMAH) to replace organic solvent based cleaning. The effluent generated in this method contains TMAH and soluble metal after all the separated and suspended solids are removed by micro filtration and ultra filtration.

In general, the effluent from cleaning and water rinse steps is first filtered to remove separated solids including solid metals from the removal of paste metals such as molybdenum, tungsten, copper and nickel metal when using molybdenum-based or other metal based screening pastes, and inorganics, such as glass, silica, which may be added in paste formulations as well as precipitated organics. The filtrate is then subjected to submicron-filtration, preferably using 0.2 $\mu$m or less filter cartridges and finally membrane filtration or ultrafiltration to remove any residual filterable solids. Metal analysis of the filtered effluent using Ion-Coupled Plasma (ICP) technique shows, however, a residual significant level of dissolved metals, particularly Mo, anywhere from 15–200 ppm (mg/liter) depending on the composition of the Mo paste used for screening, the concentration of TMAH cleaning solution, volume of solution used to clean a mask, and the amount of residue on the mask. In addition to dissolved Mo, relatively low levels of dissolved tungsten (W), less than 50 ppm, and dissolved copper (Cu), less than 1 ppm, are observed when tungsten-based pastes and Cu-based pastes are used respectively.

Considering that the environmental regulations on waste water discharge for pollution control requires that dissolved heavy metals be removed substantially completely, for example for Mo the limit being <1 ppm in discharge water, it is necessary to further treat the waste water effluents in industrial processes so that Mo as well as W, Cu and Ni are effectively removed to provide a "metals-free" effluent before being discharged as waste water.

U.S. Pat. No. 4,189,381 (Laferty et al.) describe treatment of industrial waste water containing Mo, and heavy metals Fe, Mn, Pb, Cd, and also containing cyanide ion in mineral recovery processes such as the flotation recovery of molybdenite. According to this method, Mo is first removed from the effluent by ion exchange using a weak-base amine type anion exchange resin. The eluent is then subjected to lime precipitation and followed by coagulation/flocculation to remove other metal contaminants.

U.S. Pat. No. 4,891,193 (Beutier et al.) describes a method for Mo separation from acid solutions generated in the uranium recovery from ores by using a resin with a stationary phase having oxime active groups. In this method, a sulfuric acid solution from the recovery process is passed through an oxime resin bed, then eluted with an alkali metal salt or ammonium hydroxide, and carbonate.

U.S. Pat. No. 5,082,568 (Holler et al.) describes a composite cartridge-type filter to reduce lead (Pb) concentration in drinking water where the filter comprises an activated carbon black and a powdered deionizing resin which is converted to an ion exchange resin in-situ and during use of the filter. The composite filter is also effective in removing dissolved metals that are leached out from the carbon black.

U.S. Pat. No. 4,032,457 describes a polymer bonded activated charcoal and hollow interior filled with ion exchange resin to remove lead (Pb) and other metals.

Other methods of removing soluble molybdenum are based on lime precipitation to form insoluble calcium molybdate and further treatment with ferric salts such as $FeCl_3$ or $Fe_2(SO_4)_3$ to flocculate $Fe(OH)_3$ wherein molybdate ion is removed by adsorption.

Bearing in mind the problems and deficiencies of the prior art, it is therefore an object of the present invention to provide a method of removing dissolved metals such as Mo and W in aqueous effluents particularly alkaline effluents, generated from the removal of screening paste residues from masks and from other semiconductor cleaning processes based on the use of aqueous alkaline compositions.

Yet another purpose of this invention is to provide a method for removing dissolved Mo and W in TMAH-containing effluents from mask and semiconductor cleaning processes.

Another purpose is to provide a method of removing dissolved metals from waste water using ion-exchange and absorption techniques.

Still yet another purpose of this invention is to provide a method based on ion-exchange for removing dissolved metals in aqueous TMAH-containing effluents from cleaning of conductive paste residue from screening masks.

It is also the purpose of this invention to remove dissolved Mo in aqueous waste solutions generated from the aqueous TMAH treatment of semiconductor substrates to remove Mo oxide surface layers on substrates as part of a Mo etch process using low pH etchants.

Another purpose of this invention is to provide a method for effective removal of dissolved Mo and W in aqueous effluents from mask cleaning to remove screening paste residues and semiconductor cleaning with aqueous TMAH to generate clean water which meets or exceeds the waste water discharge limit requirements for dissolved Mo, W, Cu and Ni.

Another purpose of the invention is concerned with a method for removing dissolved molybdenum (Mo) from aqueous tetramethyl ammonium hydroxide (TMAH) and related organic quaternary ammonium hydroxide containing effluent or waste waters to provide contaminant free processed water that meets the environmental standard for pollutant discharge limit for dissolved metals in the waste water.

A further purpose of this invention is removing dissolved Mo and/or W in TMAH containing waste water generated in cleaning of Mo-based screening paste residue from screening masks, and in the Mo oxide removal step in the process of etching extraneous Mo which is generally present on multilayer ceramic substrates after the sintering operation.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of removing dissolved heavy metals, e.g., molybdenum (Mo) and tungsten (W) in waste water generated from aqueous cleaning of polymer-metal conductive paste residue from screening masks and semiconductor substrates with aqueous organic bases, in particular organic quaternary ammonium hydroxides such as tetramethyl ammonium hydroxide (TMAH) such that there is neglible, preferably less than 0.5–1 ppm residual concentration of dissolved Mo if any in the waste water. It is also preferred that the waste water be substantially free of TMAH, an organic base, as well as its neutralization product, for example, tetramethyl ammonium chloride or sulfate. In one aspect, the dissolved metal removal process comprises first removing the organic base (TMAH) and dissolved copper and nickel from the effluent, e.g., by cation exchange methods, and then removing dissolved Mo and W which may be present as hydrated Mo oxides and/or molybdate ($MoO_4$ anion) and tungstate ($WO_4$ anion) by passing the organic base-free effluent through an anion exchange resin column.

The quaternary ammonium hydroxides are typically aliphatic quaternary ammonium hydroxides, in particular tetraalkyl ammonium hydroxides represented by the formula:

$R_1R_2R_3R_4NOH$ where $R_1R_2R_3$ and $R_4$ are the same or different and are selected from the group consisting of an organic radical $C_nH_{2n+1}$ with n=1–8, typically 1–4. Another quaternary ammonium hydroxide is wherein $R_1R_2$ and $R_3$ are alkyl groups, preferably the same methyl group, and $R_4$ is a substituted alkyl group, e.g., a hydroxyalkyl group. One or more of such alkyl groups can be substituted by functionalized alkyl groups, e.g., hydroxy ethyl ($CH_2CH_2OH$) as in trimethyl hydroxyethyl ammonium hydroxide. It is also possible for some of the alkyl groups to be replaced by alkenyl groups.

In another aspect of the process, filtered TMAH effluent typically containing Mo, W, Cu, Ni with Mo being the predominant amount impurity is passed through a strong base anion exchange resin. This removes essentially all Mo and W to less than 1 ppm e.g., less than 0.1 ppm. The effluent from anion exchange is subsequently processed for removal of dissolved organics before discharge as waste water.

In a further aspect of the invention after removing the TMAH and metal cations such as Cu and Ni from effluent in a cation exchange resin step, the waste water is passed through a bed of filter aid such as celite (e.g., preferably No. 521 or 545 or mixtures thereof) and activated charcoal to remove dissolved Mo and/or W by adsorption.

In another process aspect of the invention, the filtered TMAH effluent is acidified to pH about 3–6 with an acid preferably dilute HCl and the acidified effluent passed through a weak base anion exchange resin column which provided essentially complete removal of dissolved Mo and W.

DESCRIPTION OF THE PREFERRED EMBODIMENTS

Fabrication of multilayer ceramic substrates employs the technique of conductive pattern screening onto ceramic green sheets through a mask, typically a metal mask, using metal-polymer composite pastes to delineate a conductive pattern for desired circuitry. In this process, some paste residue is formed on the mask screen which is removed by mask cleaning after one or more screening passes depending on the paste type and the extent of residue. Likewise residue of metallic pastes remains on the semiconductor surface. Various types of pastes used in screening processes comprise about 65–85% metal powder, such as Mo, W, Cu, Ni, of which Mo-based pastes are predominately used, and the remaining paste components of about 15–35% are polymer binder, solvent carrier, inorganic particulate material, dispersant, thickening agent, etc.

For mask and semiconductor cleaning, an aqueous cleaning process comprising the use of a dilute aqueous solution of TMAH as one of the steps followed by water rinsing has been proposed. A quaternary ammonium base typically TMAH is normally used at a weight percent, of less than 2% preferably less than 1% by weight in water. For waste water handling in this aqueous cleaning process, the combined wash and rinse is first preferably filtered through a series of filters to remove all suspended material including metal solids, inorganic particulate material from the paste and precipitated or suspended organics, and finally through a submicron filter such as a 0.2 $\mu$m or less cartridge filter, or ultrafiltration using a membrane filter. It is found that the filtrate thus obtained contains up to 20–200 ppm (mg/liter) of dissolved Mo along with less than 50 ppm dissolved W for cleaning Mo and W based paste and also traces of copper and nickel from copper and nickel based pastes which makes it necessary to provide a treatment method for effective removal of dissolved metals so that it meets the environmental pollutant discharge standard limit for these metals in waste water.

In one aspect, the filtered effluent is directly passed through an anion exchange resin (strong base) that removes dissolved Mo and/or W. The effluent is then processed for removal of TMAH by ion exchange or it is subjected to an alternate process for removal of TMAH and other contaminants. Subsequently, the metals can be recovered by elution from the column according to well known processes for example those based on ion exchange methodology.

Another embodiment of this invention concerns the removal of dissolved Mo in aqueous TMAH containing waste solution obtained from one of the steps of semiconductor cleaning in the overall Mo etching or extraneous Mo removal process. The waste solutions are generated in the process of removing Mo debris or extraneous Mo formed in the sintering process on ceramic substrates using low pH Mo etchants (less than pH 2–3), and then treating with aqueous TMAH to remove the black Mo-oxide passivation layer formed on Mo features of the multilayer ceramic substrates during the Mo etching process.

The combined TMAH treatment waste solution and water rinse from the oxide removal processes show substantial levels of dissolved Mo and thus before the waste water could be discharged, a treatment is required to remove Mo such that the waste water meets the environmental pollutant discharge standard limit for Mo.

The preferred method of the invention is based on cation exchange to remove TMAH from the waste water followed by anion exchange treatment to remove the dissolved Mo ions as described above. Using a cation exchange method to remove tetraalkyl ammonium, e.g., tetramethyl ammonium cation $[CH_3)_4N^+]$ with a follow-up treatment of the TMAH-free eluate with an anion exchange resin results in substantially complete removal of dissolved Mo.

In an alternate sequence, dissolved Mo is removed by passing the filtered effluent through an anion exchange resin. The eluate is then processed through a cation exchange resin to remove TMAH and the dissolved organics. Cation and anion exchange resins useful in the process for metals removal in TMAH containing aqueous waste solutions according to this invention include polystyrene crosslinked with DVB (divinyl) benzene matrix based resins such as Rohm and Haas ion exchange resins sold under the trade name "Amberlite" and Bayer AG resins sold under the trade name "Lewatit".

In the first step in one aspect of the subject process the alkaline waste water is subjected to cation exchange treatment, e.g., Amberlite-120 Plus (hydrogen form, a strong acid type) to remove tetramethyl ammonium cation $[CH_3)_4N^+]$ and metal cations such as copper and nickel. This step is followed by the anion exchange treatment of the eluate, for example, using a strongly basic resin such as Amberlite IRN-78 (hydroxide-form), a quaternary ammonium divinyl benzene (DVB)/styrene co-polymer. In place of IRN-78, a strong base resin such as Amberlite IRA 400 (a quaternary ammonium hydroxide) is also effective for Mo and W removal.

Alternatively, weak acid cation exchange resins having —COOH as the active group and weak base anion exchange resins carrying quaternary/tertiary amine functionality attached to styrene-DVB polymers can be used. Examples of weak anion exchange resins include Amberlite IRA-99, IRA-96 and Lewatit MP64 which are based on tertiary amino groups attached to a copolymer of styrene-DVB matrix.

The cation exchange resin carrying the removed tetraalkyl ammonium cation $[(CH_4)_3\ N_+]$ and metal cations can be eluted with a strong acid, typically, dilute hydrochloric acid or sulfuric acid to regenerate the resin (H-form) for repeat processing. The anion exchange resin carrying removed metals, specifically Mo and/or tungsten in the present case can be eluted with a strong base (or acid followed by base) to regenerate the resin (OH-form) for repeat processing. Methods for elution of metals from the ion exchange resins are well known in the art. Column regeneration techniques for cation and anion exchange resins are well known in the art.

Conventional ion exchange procedures are used as is well-known in the art. Generally the solutions used as ion exchange processing are at room temperature.

Other methods for Mo and W removal according to this invention include passing the effluent after cation exchange step through a filter aid such as Celite and activated charcoal. The Celite and activated charcoal treatment can be a mixed bed column preferably the filter aid will form the first layer and the activated charcoal the top layer. In another process aspect of the invention, the filtered TMAH effluent is acidified to pH about 3–6 with an acid preferably dilute HCl and the acidified effluent passed through a weak base anion exchange resin column which provided essentially complete removal of dissolved Mo and W.

The following representative examples are provided to further illustrate the invention.

EXAMPLE 1

A cation exchange resin, Amberlite IRA 120 Plus (hydrogen form), was pre-cleaned as follows: the resin was suspended n 5% (weight %) sodium hydroxide in deionized water (DI water) to convert to Na+ form, gently stirred for 5 minutes, the supernatant was decanted and the resin was washed repeatedly with DI water, then treated with 5% hydrochloric acid with gentle stirring, and the supernatent decanted and the resin repeatedly washed with DI water. The regenerated resin (hydrogen form) was transferred to a one-inch O.D., 30 cm column and the resin bed again rinsed again with DI water till it is free of excess acid- when it had a pH of about 6.3–6.7.

About 300 cc of a 0.2 micron cartridge filtered sample of an effluent from mask cleaning containing about 0.35% (by weight) TMAH and pH about 12 and about 48.3 ppm dissolved Mo and having about 0.2 ppm each of Cu, W and Ni was passed through the column at a rate of 15–20 cc/min. The initial 50–100 cc of eluate was discarded before starting collection. The cation exchanged eluate had a pH about 5–8 and Mo analysis showed 43.7 ppm Mo concentration compared to about 48 ppm in the starting sample. Analysis for Cu and Ni showed less than 0.1 ppm each. The effluent from the cation exchange column was subsequently passed through an Amberlite IRN-78 column, a quaternary amine DVB/styrene copolymer strongly basic anion exchange resin (OH⁻form), which resulted in essentially complete removal of Mo showing Mo less than 0.1–0.2 ppm as shown by ICP (Ion Coupled Plasma) analysis. Analysis for W, Cu and Ni showed less than 0.1 ppm in each case. The column was continued to be used until the feed solution and the eluant showed the same level of Mo showing resin saturation. Resin regeneration at this point and reclamation of Mo could be performed using well known methods for these operations.

The above example was repeated using an anion exchange resin first to remove Mo and W. Anion Exchange Resin Amberlite IRN-78 was pre-cleaned by washing with dilute HCl to convert to Cl⁻form, then with NaOH to regenerate the OH⁻ form and washing with DI water before use. Similar results were obtained with essentially complete removal of dissolved Mo.

EXAMPLE 2

An effluent from a mask cleaning operation which had about 48.3 ppm dissolved Mo and traces of Cu, W and Ni was processed through a cation exchange resin treatment to remove TMAH and metal cations as described in Example 1. A sample of the effluent was filtered through a mixed bed of Celite 545 filter-aid and activated Charcoal (which had been prepared by washing repeatedly with deionized water prior to use), then the filtrate was filtered through a 0.2 micron cartridge filter. Metals analysis of the resulting filtrate showed about 7–8 ppm residual Mo, about a 70–80% reduction when compared with starting concentration of about 48.3 ppm. Without first passing through a cation resin, unacceptable Mo reduction was obtained.

EXAMPLE 3

A sample of filtered effluent from mask cleaning with an aqueous TMAH aqueous solution was neutralized with HCl to a pH about 5–6, then filtered through a mixed bed of Celite filter aid and activated charcoal followed by 0.2 micron cartridge filtration. Metals analysis of the resulting filtrate showed about 36 ppm residual Mo, less than about 30% reduction when compared with a starting concentration of about 50 ppm.

When only the filter-aid Celite bed was used in the absence of activated charcoal, there was less than 15% reduction in concentration of Mo in the filtrate.

EXAMPLE 4

An aliquot of an aqueous TMAH containing waste solution from removal of a surface layer of Mo oxide formed on substrates using acidic etchants to remove Mo debris was filtered through a 0.2 micron cartridge filter to remove suspended material. The filtrate showing 100–200 ppm dissolved Mo, was passed through a cation exchange resin, then through a weak base anion exchange resin bed or through a strong base anion exchange resin. The resulting effluent was substantially free of dissolved Mo showing less than 1 ppm residual Mo.

EXAMPLE 5

An effluent from mask cleaning with less than 1% aqueous TMAH solution having about 81 ppm dissolved Mo and traces of dissolved W, Cu and Ni (less than 0.5 ppm each), was passed through a cation exchange resin column. The ion exchanged effluent showed 72.8 ppm Mo, less than 0.1 ppm W and Cu and 0.3 ppm Ni according to ICP analysis. Subsequently, the effluent was passed through a strong base anion exchange resin Amberlite IRN-78 (OH⁻ form) and the effluent analysis showed less than 0.1 ppm Mo, W, Cu and Ni each.

When the initial effluent from mask cleaning was directly treated with an anion exchange resin IRN-78 (strong base OH⁻ form), analysis again showed dissolved Mo at less than 0.1 ppm and Cu, W, Ni at less than 0.1 ppm each.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of removing dissolved molybdenum or tungsten metal from alkaline waste water containing copper, nickel and a quaternary ammonium hydroxide organic base consisting essentially of the following steps:

providing an alkaline waste water containing dissolved molybdenum or tungsten metal and copper, nickel and a quaternary ammonium hydroxide organic base;

removing the organic base, copper and nickel from the waste water with a cation exchange resin to produce a first effluent substantially free of organic base and copper and nickel; and passing the first effluent through an anion exchange resin to produce a second effluent substantially free of dissolved molybdenum or tungsten metal.

2. The method of claim 1 wherein the quaternary ammonium hydroxide is tetramethyl ammonium hydroxide.

3. The method of claim 2 wherein the dissolved metal is tungsten.

4. The method of claim 2 wherein the dissolved metal is molybdenum.

5. A method of removing dissolved molybdenum or tungsten metal from alkaline waste water containing copper, nickel and a quaternary ammonium hydroxide organic base consisting essentially of the following steps:

providing an alkaline waste water containing dissolved molybdenum or tungsten metal and copper, nickel and a quaternary ammonium hydroxide organic base;

removing the organic base, copper and nickel from the waste water with a cation exchange resin; and filtering the waste water through a filter aid and activated carbon bed to remove dissolved molybdenum or tungsten metal.

6. The method of claim 5 wherein the quaternary ammonium hydroxide is tetramethyl ammonium hydroxide.

7. The method of claim 5 wherein the dissolved metal is tungsten.

8. The method of claim 5 wherein the dissolved metal is molybdenum.

9. A method of removing dissolved metals from alkaline waste water containing molybdenum, copper, tungsten, nickel and a quaternary ammonium hydroxide organic base consisting essentially of the steps:

providing an alkaline waste water containing dissolved molybdenum, copper, tungsten and nickel metals and a quaternary ammonium hydroxide organic base wherein the copper, tungsten and nickel are present in trace amounts less than about 0.5 ppm each; and passing the waste water through a strong base anion exchange resin in the OH_form to remove the dissolved metals.

10. The method of claim 9 wherein the quaternary ammonium hydroxide is tetramethyl ammonium hydroxide.

* * * * *